Apr. 10, 1923.
H. R. LONTZ
RESILIENT BEARING SLEEVE
Filed Aug. 22, 1919
1,451,428
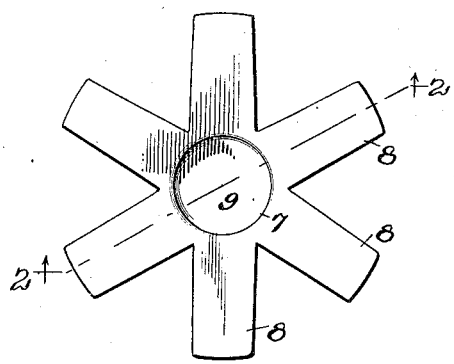
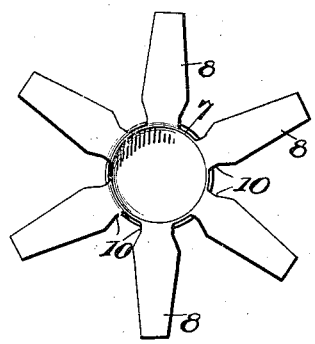
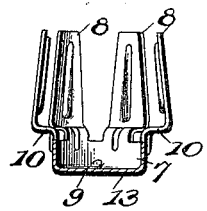
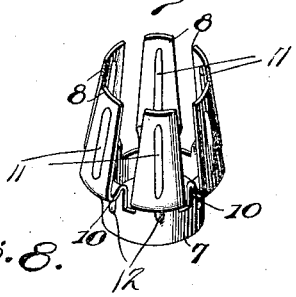
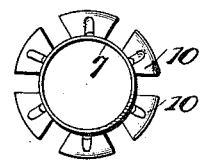
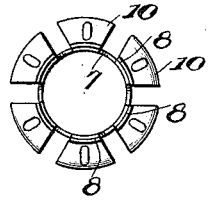
Inventor.
Harry R. Lontz,
by
Munro, Cameron, Lewis & Kerkam, his Atty's.

Patented Apr. 10, 1923.

1,451,428

UNITED STATES PATENT OFFICE.

HARRY R. LONTZ, OF RICHMOND, INDIANA.

RESILIENT BEARING SLEEVE.

Application filed August 22, 1919. Serial No. 319,223.

*To all whom it may concern:*

Be it known that I, HARRY R. LONTZ, a citizen of the United States of America, and a resident of Richmond, Indiana, have invented new and useful Improvements in Resilient Bearing Sleeves, which invention is fully set forth in the following specification.

This invention relates to resilient bearing sleeves and the method of making the same.

It has heretofore been proposed, as in the patent of Brown, No. 1,031,417, granted July 2, 1912, wherein the invention is illustrated as embodied in a bearing for the rotary cutter blades of a lawn-mower, to provide a bearing with a resilient bearing sleeve which, under the influence of a spring, will coact with the bearing members to take up any slack therebetween but which will grip the shaft or other supporting member, when a proper bearing pressure has been obtained, to prevent the force of the spring from being exerted on the bearing itself. Resilient bearing sleeves of this type must be made of the proper size within very close limits and, to avoid the expense and labor of machining to substantially mathematical exactness, it has been proposed to make these sleeves of die castings. This manner of manufacture, however, has necessitated the use of a metal which lends itself to diecasting, and it has been found exceedingly difficult, if not impossible, to produce a resilient bearing sleeve by this method which is both sufficiently resilient to perform its intended function and sufficiently tough and strong to withstand breakage during assembling and the exigencies of use.

It is an object of this invention to provide a bearing sleeve which is both sufficiently resilient and strong and durable, and which can be manufactured with a minimum expenditure of time and labor.

A further object of the invention is to provide a resilient bearing sleeve of sheet metal, preferably steel, by stamping or pressing the same up in a simple and efficient manner.

Yet another object of the invention is to provide a resilient bearing sleeve that is both lighter and stronger than has been produced by methods heretofore in use.

A still further object of the invention is to provide a method of making a resilient bearing sleeve whereby a sleeve suitable for assembly in the bearing structure may be produced by stamping operations only and whereby but a minimum of stamping operations are employed.

The invention is capable of receiving a variety of expressions, one of which is illustrated on the accompanying drawings, but it is to be expressly understood that the drawings are for purposes of illustration only and are not to be construed as a definition of the limits of the invention, reference being had to the appended claims for that purpose.

In said drawings:—

Fig. 1 is a plan view of the "rough" blank from which the sleeve is to be pressed up;

Fig. 2 is a section on line 2—2 of Fig. 1;

Fig. 3 is a plan view of the trimmed blank;

Fig. 4 is a cross section between two of the radial arms showing the blank after the first forming operation;

Fig. 5 is a cross-section of the blank after the second forming operation;

Fig. 6 is a perspective view of the finished sleeve; and

Figs. 7 and 8 are respectively bottom and top plan views of the finished sleeve.

In accordance with the present invention, the resilient bearing sleeve is pressed up from sheet metal which, to secure both strength and resiliency, is preferably steel. Within the broader aspects of this invention, the sleeve may be stamped or pressed up in any suitable way, but the preferred procedure, and one which constitutes a part of the present invention, is as follows:—

A rough blank is first cut from a sheet of metal of suitable thickness to secure the desired strength and resiliency, such blank comprising, as shown in Fig. 1, a central circular portion 7 and a plurality, six being shown, of radial arms 8. Simultaneously with this cutting operation, or subsequently as a separate step if desired, the central portion of the blank is drawn down into a hub-like depression, as shown at 9 in Fig. 2, the inner diameter of the depression being substantially that of the shaft or other support on which the sleeve is to be mounted in the completed bearing.

The rough blank is then subjected to a finishing cut by which, as shown in Fig. 3, the arms are given a slightly tapered formation and are cut away adjacent where they join the hub-like depression 9 to form reduced neck-portions 10. Under some circumstances the roughing cut may be omitted and the blank cut from the sheet of metal in the finished form shown in Fig. 3; the procedure outlined, however, is preferred.

The blank is next subjected to a forming operation whereby the reduced neck-portions 10 are bent back upon themselves along lines intermediate of their length, as shown in Fig. 4, whereby the body portions of the radial arms are bent at a small angle to a plane right-angularly disposed to the axis of the hub-like depression 9, as also clearly shown in Fig. 4. In order to prevent the arms from buckling in the operation of the bearing, it is desirable to strengthen both their body portions and their necks. This may be done by pressing a rib into the body portion of each arm, as shown at 11 in Fig. 6, and a corresponding rib into each neck, as shown at 12 in the same figure. While these reinforcing ribs may be pressed into the radial arms at any suitable stage in the manufacture of the sleeves, it is preferred to form the ribs at the same time that the forming operation above described is performed.

The blank is next subjected to a forming operation whereby the portions of the necks 10 which have been bent over are brought into a plane at substantially a right angle to the axis of the hub-like depression 9, as shown in Fig. 5. This bending operation also brings the body portions of the radial arms to a position inclined at a small angle to the axis of the hub, as also clearly shown in Fig. 5. The bottom 13 of the depression 9 is then cut out to complete the hub, and the sleeve is subjected to a final forming operation whereby the resilient arms 8 are brought into their final axially-inclined positions, as shown in Fig. 6, the diameter of the opening formed by the free ends of said arms being slightly in excess of the diameter of the shaft or other support on which the sleeve is to be mounted.

The sleeve may thus be formed to substantially exact size without any machining operation, and possesses sufficient resiliency so that, when assembled in a bearing of the type described and illustrated in the patent to Brown above referred to, it will perform its function with maximum efficiency. At the same time the sleeve possesses sufficient strength to prevent breakage during assembly and subsequent use and is lighter than sleeves produced by methods heretofore suggested.

While a preferred manner of making the resilient bearing sleeve of this invention has thus been set forth in detail, it is to be understood that as respects the broader features thereof, the invention is not limited to use of the method described, as the sleeve may be made in any suitable way. Changes may also be made in the details of procedure of the method outlined without departing from the spirit of my invention, while the cutting and forming operations may be carried out by any suitable means. Reference is therefore to be had to the claims hereto appended for a definition of the limits of this invention.

What is claimed is:—

1. A device of the character described composed of an integral piece of resilient sheet-metal and having a shaft-receiving hub portion and a plurality of shaft-gripping fingers which engage the shaft only at their outer ends.

2. A device of the character described composed of a single piece of resilient sheet-metal having a cylindrical shaft-receiving hub portion, a plurality of symmetrically arranged radial arms on said hub portion, and inwardly inclined shaft-gripping fingers secured to said radial arms.

3. A device of the character described composed of a single piece of resilient sheet-metal having a cylindrical shaft-receiving hub portion, a plurality of symmetrically arranged radial arms on said hub portion, and inwardly directed fingers secured to said radial arms, the free ends of said fingers providing a circumferentially interrupted shaft engaging portion of substantially the same diameter as said hub portion.

4. A device of the character described composed of a single piece of resilient sheet-metal and comprising a cylindrical shaft-receiving hub portion, a plurality of outwardly extending radial arms on said hub portion spaced circumferentially with respect to the same, and fingers secured to said radial arms and inclined uniformly inward until their ends form an interrupted circle of substantially the diameter of the hub portion.

In testimony whereof I have signed this specification.

HARRY R. LONTZ.